US006536945B2

United States Patent
Rolston (10) Patent No.: US 6,536,945 B2
(45) Date of Patent: Mar. 25, 2003

(54) MEASUREMENT OF HEAT FLUX IN A HEATED CHAMBER

(75) Inventor: Robert Mitchell Rolston, High Wycombe (GB)

(73) Assignee: United Biscuits (UK) Limited, Hayes (GB)

(*) Notice: Subject to any disclaimer, the term of this patent is extended or adjusted under 35 U.S.C. 154(b) by 0 days.

(21) Appl. No.: 09/965,794

(22) Filed: Oct. 1, 2001

(65) Prior Publication Data

US 2002/0042036 A1 Apr. 11, 2002

(30) Foreign Application Priority Data

Oct. 9, 2000 (GB) ............................................... 0024702

(51) Int. Cl.[7] .......................... G01K 17/20; G01K 7/02; G01J 5/12; F27B 1/26; F27B 9/40
(52) U.S. Cl. .......................... 374/30; 374/166; 374/179; 136/224; 702/136
(58) Field of Search ............................ 374/30, 29, 166, 374/137, 179; 702/136, 130; 136/224, 227

(56) References Cited

U.S. PATENT DOCUMENTS

| | | | | |
|---|---|---|---|---|
| 3,348,047 A | * | 10/1967 | Clifford | 374/30 |
| 4,309,901 A | * | 1/1982 | Rolinski et al. | 374/29 |
| 4,567,365 A | * | 1/1986 | Degenne | 136/224 |
| 4,779,994 A | * | 10/1988 | Diller et al. | 374/29 |
| 4,850,713 A | * | 7/1989 | Thery et al. | 374/30 |
| 4,906,105 A | * | 3/1990 | Geake | 374/30 |
| 5,161,889 A | * | 11/1992 | Smith et al. | 374/29 |
| 6,062,728 A | * | 5/2000 | Breunsbach et al. | 374/166 |
| 6,264,362 B1 | * | 7/2001 | Rolston | 374/29 |
| 6,278,051 B1 | * | 8/2001 | Peabody | 374/30 |
| 6,402,372 B1 | * | 6/2002 | Saunders | 374/166 |

FOREIGN PATENT DOCUMENTS

| | | |
|---|---|---|
| GB | 2 183 346 A | 6/1987 |
| GB | 2 275 106 A | 8/1994 |
| GB | 2 300 102 A | 10/1996 |
| GB | 2 317 014 A | 3/1998 |
| WO | 98/09143 A1 | 3/1998 |
| WO | WO 200109578 A1 * | 2/2001 ............ F24J/3/00 |

* cited by examiner

Primary Examiner—Diego Gutierrez
Assistant Examiner—Stanley J. Pruchnic, Jr.
(74) Attorney, Agent, or Firm—Burns, Doane, Swecker & Mathis, L.L.P.

(57) ABSTRACT

A heat flux measuring device for transporting through a heated chamber, the device having an array of sensors, each sensor comprising first and second surfaces bounding a region, a thermally insulating layer substantially occupying said region, and means for providing a signal which is a measure of the temperature difference across the layer. The said first surface of each sensor is in thermal contact with a heat sink and the said second surface of each sensor is exposed. A plurality of the said exposed surfaces of the array are reflective to radiation and a further plurality of the said exposed surfaces of the array are absorbent to radiation, the sensors of the array being so arranged that the area of radiation-absorbing exposed sensor surface and the area of radiation-reflecting exposed sensor surface are each substantially equally distributed about a mid-line of the array extending along the direction in which in use the device will be transported and about a mid-line of the array extending along the direction transverse to the direction in which in use the device will be transported.

31 Claims, 4 Drawing Sheets

MEASUREMENT OF HEAT FLUX IN A HEATED CHAMBER

This application claims priority under 35 U.S.C. §§ 119 and/or 365 to application Ser. No. 0024702.3 filed in the United Kingdom on Oct. 9, 2000; the entire content of which is hereby incorporated by reference.

The invention relates to the measurement of heat flux in heated chambers, for example, in ovens of the kind that are suitable for use in continuous processes in which material to be heated (which may be in the form of discrete articles) is transported through the oven and is heated progressively during its passage through the oven. Such ovens are known as tunnel ovens because they are elongate and have at one end an entrance through which the material is introduced into the oven and, at the other end, an exit through which the material is withdrawn. Tunnel ovens are used for a variety of purposes, for example, to dry material or to effect the baking of food products.

The heat flux to be measured is that incident on a surface of the material to be heated. In general, the heat flux will have radiative and convective components. The material will normally be supported from below on the upper run of an endless band conveyor and, where the band is imperforate, the only exposed surface of the material will be its upper surface. Where the band is a mesh, the lower surface of the material will be partly exposed to the heat flux, but it is the heat flux incident on the upper surface of the material that is here of prime concern.

It is often important to measure separately the radiative and convective components of the heat flux, and that can be done by comparing measurements made using a radiation-absorbing sensor with measurements made using a reflecting sensor. In each case, the heat flow can be determined by measuring, together with certain other quantities, the temperature difference across a thermally insulating layer located between the exposed surface of the sensor and a heat sink. Essentially, the radiation-absorbing sensor responds to the total heat flux whereas the reflecting sensor responds only to the convective component of the heat flux.

Of course, neither sensor will behave either as a black body or as a perfect reflector; each sensor will both absorb and reflect radiation incident on it. It is strictly necessary only that the two sensors should have different absorptivities, but the more nearly the radiation-absorbing sensor behaves as a black body and the more nearly the reflecting sensor behaves as a perfect reflector the better the apparatus will perform. Throughout the specification, references to a surface or a sensor being radiation-absorbing or radiation-reflecting are to be understood as taking account of those facts.

An apparatus have two such sensors and arranged to operate in that way is described in UK Patent Specification No 2 183 346B. Typically, the heat flux will vary significantly along the length of a tunnel oven, with considerable variations occurring over relatively small distances. That will be especially marked when, for example, the heat flux is primarily radiative and derives from burners or other heating elements extending across the width of the oven at intervals along its length. Thus, the axial profile of the heat flux will show pronounced peaks and troughs, and the apparatus of the invention is intended to enable the precise form of that profile to be ascertained.

Where there is high spatial frequency of the fluctuations of the heat flux along the length of the oven, it seems clear that the two sensors must pass through the oven side-by-side. In a well designed oven, variations in the heat flux across the width of the oven will be small, but they will not usually be entirely negligible. Therefore, in order to minimise the effect of those variations across the width of the oven, the two sensors must be situated close together.

In International Specification no. WO98/09143, the relatively large variations in the heat flux along the length of the oven and the relatively smaller variations across the width of the oven are taken account of by conveying through the oven, one behind the other, a radiation-absorbing sensor and a radiation-reflecting sensor, and time-adjusting the readings from the sensors according to their speed of travel such that readings corresponding to the same position along the length of the oven are compared.

It has now been found that, by adoption of certain configurations of sensors, it is possible to compensate for the variations in heat flux along and across a heated chamber, especially a tunnel oven, without the need to provide for time-adjustment of readings.

The invention provides a heat flux measuring device for transporting through a heated chamber, the device having an array of sensors, each sensor comprising first and second surfaces bounding a region, a thermally insulating layer substantially occupying said region, and means for providing a signal which is a measure of the temperature difference across the layer, said first surface of each sensor being in thermal contact with a heat sink and said second surface of each sensor being exposed, a plurality of the said exposed surfaces of the array being reflective to radiation and a further plurality of the said exposed surfaces of the array being absorbent to radiation, the sensors of the array being so arranged that the area of radiation-absorbing exposed sensor surface and the area of radiation-reflecting exposed sensor surface are each equally distributed about a mid-line of the array extending along the direction in which in use the device will be transported and about a mid-line of the array extending along the direction transverse to the direction in which in use the device will be transported.

The device of the invention can be of relatively simple construction, but nevertheless make allowance for variations in heat flux within the chamber and thus permit relatively accurate measurements of the heat flux to be made in a relatively straightforward manner.

Each reflecting exposed surface may be a surface of the insulating layer of the respective sensor. Each reflecting exposed surface may instead comprise a layer of heat-conductive material having a reflecting surface that is in thermal contact with the insulating layer of the respective sensor.

Each absorbing exposed sensor surface may be a surface of the insulating layer of the respective sensor. Each absorbing exposed sensor surface may instead comprise a layer of heat-conductive material having a radiation-absorbing surface that is in thermal contact with the insulating layer of the respective sensor. Advantageously, the array is so arranged that the reflecting and absorbing surfaces form portions of a substantially continuous surface. Thus, in a preferred form of the device, the exposed sensor surfaces may each be a portion of a continuous layer, for example, of a flexible sheet of material which is arranged to be reflecting in selected regions and arranged to be radiation-absorbing in other regions. For example, the sensor surfaces may each be a region of sheet of a metal foil, for example an aluminium foil, of which selected regions have been treated, for example, by blackening with a matt black paint, to render them absorbing to radiation.

It is preferred for the radiation-reflecting and radiation-absorbing exposed sensor surfaces to be spaced from one another. In that case, the separation between the radiation-reflecting surfaces and the radiation-absorbing surfaces is advantageously at least 5 mm.

The device may be arranged to generate a cumulative signal representative of the sum of the individual sensor signals of those sensors having a reflecting surface. In general, that will be achieved by connecting in series those sensors having a reflecting surface. Similarly, the device may be arranged to generate a cumulative signal representative of the sum of the individual sensor signals of those sensors having an absorbing surface, and that will in general be achieved by connecting in series those sensors having a radiation-absorbing surface. Such arrangements of the device are preferred, but it is also possible to arrange for the individual sensor signals to be summed or averaged in data processing means associated with the device. The said associated data processing means may be arranged to travel with the device, in use, or be situated outside the heated chamber.

Advantageously, there is provided means for comparison of a cumulative signal representative of the signals of those individual sensors having a reflecting surface with a cumulative signal representative of the signals of those individual sensors having an absorbing surface. Such a comparison of the cumulative signal for the reflecting sensors with the cumulative signal for the absorbing sensors can provide an indication of radiant heat received by the sensors. As mentioned previously, the radiation-absorbing sensors will not normally be perfectly absorbing and the radiation-reflecting sensors will not normally be perfectly reflecting. For practical purposes, the comparison result so obtained may be adequate. If desired, however, the actual value of the radiation heat flux may be calculated using the two cumulative values, provided that certain other parameters are known or can be measured (see equations (1) and (2) below).

Each of the said exposed sensor surfaces of the array is preferably of substantially equal area. Preferably, the exposed surfaces of the array together have an overall substantially rectangular, or substantially square, configuration. Preferably, the individual reflecting surfaces and the individual absorbing surfaces are each substantially rectangular or substantially square.

Preferably, the array comprises three or more radiation-reflecting sensor surfaces and three or more radiation-absorbing sensor surfaces. Preferably, the array comprises at least two parallel rows of alternate reflecting sensor surfaces and absorbing sensor surfaces extending in the direction in which in use the device travels. Preferably, the array comprises at least two parallel lines of alternate reflecting sensor surfaces and absorbing sensor surfaces extending in the transverse direction. It will be appreciated that the number of rows and the number of transverse lines of alternate reflecting and absorbing surfaces will preferably be an even number where the reflecting and absorbing exposed sensor surfaces are substantially of equal size.

Whilst it is preferable for the overall configuration of the exposed surfaces of the array to be substantially rectangular or substantially square, in each case having rectangular or square individual exposed sensor surfaces, other configurations may be suitable. For example, the overall configuration may be round (for example, circular), and the individual exposed sensor surfaces may each be located within a respective sector of the round configuration, with alternating radiation-absorbing and radiation-reflecting sectors, or even with radiation-absorbing and radiation-reflecting sensor surfaces alternating in both circumferential and radial directions.

Advantageously, in each sensor a thermopile constitutes the layer of a thermally insulating material and the means for providing a signal representing the temperature difference across the layer. A thermopile comprises a thin layer of an insulating material, for example, a piece of thin film of a plastics material, in which are embedded thermocouples connected in series and so arranged that the cold junction of each thermocouple is located close to one surface of the layer and the hot junction of each thermocouple is located close to the other surface of the layer. The use of a plurality of thermocouples connected in series both gives a spread of readings over the area where the thermocouple junctions are situated and, more importantly, gives a larger signal for a given temperature difference. Further because of the construction of a thermopile, it is possible to arrange that it has a small thermal capacity and hence a short response time.

It will be appreciated that the expression "thermally insulating layer" includes not only arrangements having a monolithic layer of thermally insulating material, but also arrangements in which the layer is made up of two or more sub-layers of thermally insulating material.

Where, as in the case of thermopiles, the temperature difference is determined using electrical means, it may be necessary to provide electrical insulation between the electrical means and certain adjacent parts of the device. For example, a thin electrically insulating layer may be provided to insulate the thermopile electrically from any additional layer of heat-conductive material that forms the absorbing surfaces and/or the reflecting surfaces of the sensor of which the thermopile forms a part.

It is desirable that the area of the exposed surfaces of the sensors should be large because that permits the use of thermopiles with a large number of junctions and so provides a larger signal representing the temperature difference across the layer of a thermally insulating material. On the other hand, it has been found that increasing the linear dimension of the exposed surfaces of the sensors in the direction of travel of the apparatus through the oven impairs the spatial resolution of the apparatus for the variations in heat flux in that direction.

Preferably, the device comprises means for ascertaining the temperature of the radiation-absorbing sensor surfaces and/or means for ascertaining the temperature of the radiation-reflecting sensor surfaces. In each case, those means advantageously comprise a thermocouple junction located at at least one exposed absorbing surface and a thermocouple junction located at at least one exposed reflecting surface.

Preferably, the device comprises means for ascertaining the gas temperature in the vicinity of the exposed surfaces of the sensors. Although, in principle, measurement of gas temperature in the vicinity of both the reflecting surfaces and the absorbing surfaces would give improved accuracy, it has been found that the variation in gas temperature is not usually sufficient within the vicinity of the device for it to be necessary to take that into account. The means for ascertaining the gas temperature may, for example, be a flexible air thermocouple.

Advantageously, the heat sink is a unitary body of heat conductive material. The heat sink may comprise a metal block. If desired, the sensors may be mounted on portions of the metal block that are raised, for example by at least 5 mm, above the upper surface of the remainder of the block. The sensors are in thermal contact with the heat sink. It is not necessary for the sensors to be in direct contact with the heat sink, provided that thermal conduction between the sensor and heat sink is efficient. In many cases, for example where as described above the sensor includes a thermopile, the sensor should be electrically insulated from the heat sink, for example, by a thin layer of electrically insulating material which does not inhibit to a material extent thermal conduction between the sensor and the heat sink.

In practice, the device may be mounted in a casing which has a recess for receiving the device such that the exposed sensor surfaces are substantially coplanar with the unrecessed region of the casing surrounding the recess. The apparatus, including the casing and the device, is advantageously provided with a removable extension arranged to provide a horizontal surface substantially coplanar with the upper surface of the casing and with the upper surface of the device located therein, and extending away from one end of the casing, the extension extending beyond the lateral extremities of the sensor device. The provision of such a plate eliminates or reduces the effect on the measurements that might otherwise result from the disturbance of the gas flow within the oven caused by the presence of the apparatus. The plate may be detachable, for example if the apparatus is to be used to measure the heat flux close to a side of the oven.

The invention further provides a method of measuring heat flux in a heated chamber, comprising conveying through at least a portion of the chamber a heat flux measuring device having an array of sensors, a plurality of the sensors each having an exposed surface which is reflecting to radiation and a further plurality of the sensors each having an exposed surface which is absorbing to radiation and the sensors of the array being so arranged that the area of radiation-absorbing exposed sensor surface and the area of radiation-reflecting exposed sensor surface are each substantially equally distributed about a mid-line of the array extending along the direction in which the device is transported and about a mid-line of the array extending along the direction transverse to the direction in which the device is transported, monitoring the outputs of the respective sensors and deriving from the said outputs a value which is representative of the heat flux.

Advantageously, the output of those sensors of which the exposed surface is reflecting to radiation is summed. Advantageously, the output of those sensors of which the exposed surface is absorbent to radiation is summed. Preferably, the output of those sensors having a reflecting surface is summed to generate a first summation product relating to convective heat flux, and the output of those sensors having an absorbing surface is summed to generate a second summation product relating to the combined radiative and convective heat flux, and a value for the radiative component is calculated from said first and second summation products.

One form of apparatus for measuring heat flux in a tunnel oven and comprising a device constructed in accordance with the invention will now be described, by way of example, with reference to the accompanying drawings, of which.

Figure 1:
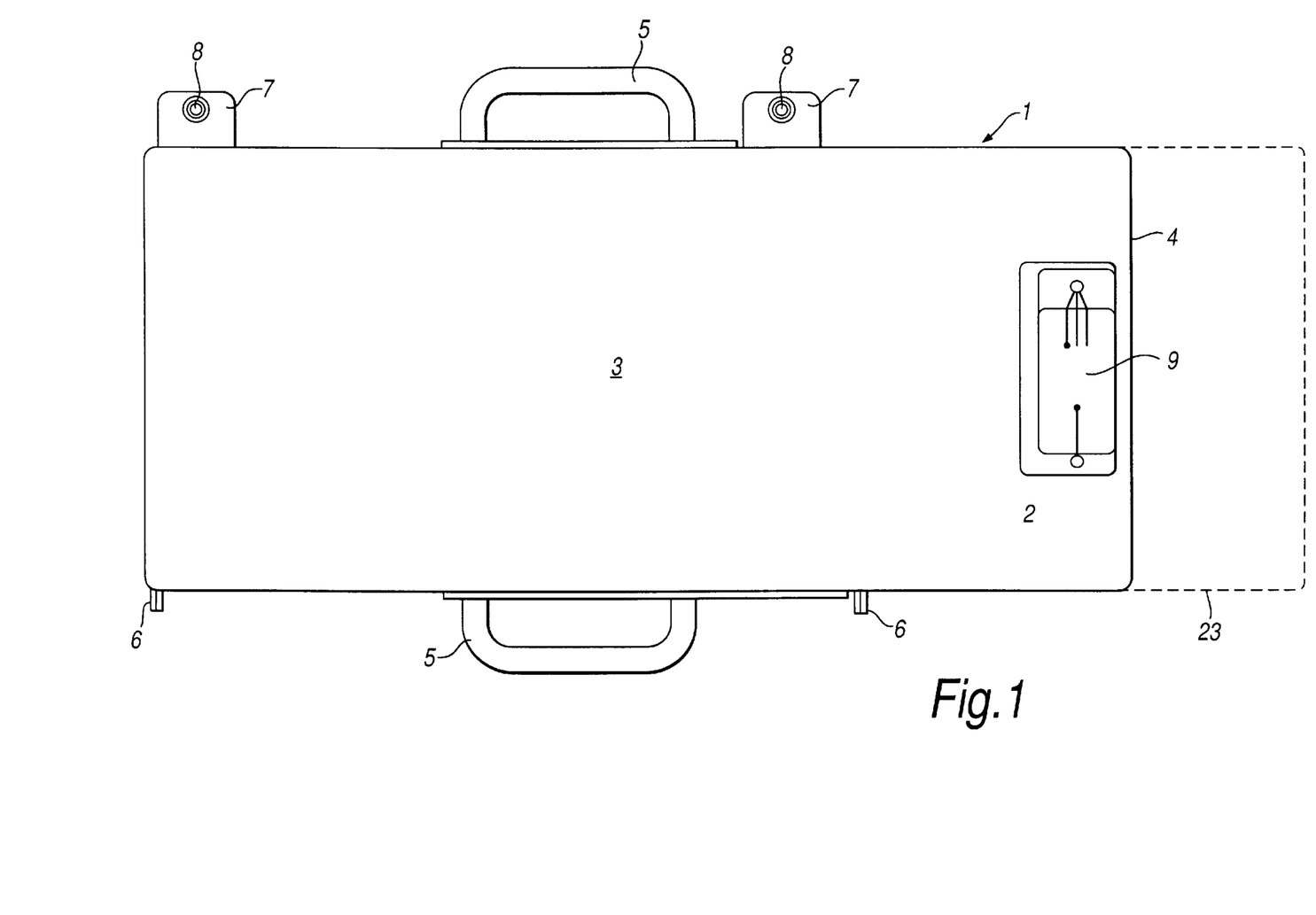
FIG. 1 is a plan view of the apparatus.

Referring to FIG. 1 of the accompanying drawings, the apparatus comprises a casing 1, which has the shape of a shallow rectangular parallelepiped. A rectangular aperture 2 is formed in upper wall 3 of the casing and close to leading end 4 of the casing, that is to say, the end of the casing that, in use enters the oven first. Secured to the sides of the casing are two carrying handles 5. The upper wall 3 of the casing is hinged to a lower part of the casing at 6 and is releasably secured in its closed position by means of two pairs of flanges 7, each of which has a threaded aperture 8 for engagement by a closure screw.

Figure 2:
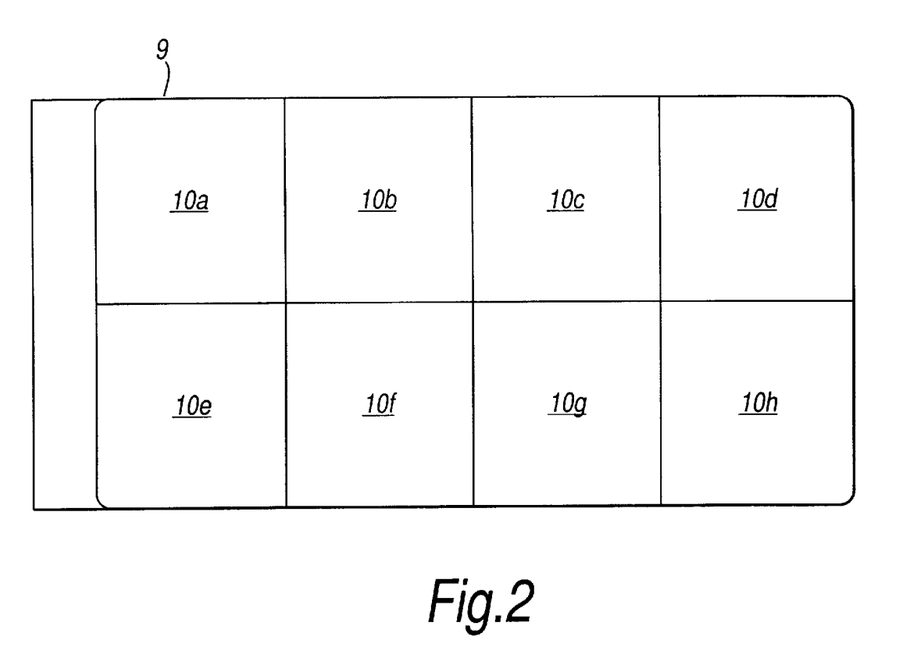
FIG. 2 is a plan view on a larger scale of a sensor device which forms a part of the apparatus.

Within the aperture 2, there is located a heat flux measuring device 9. The measuring device 9 comprises an array of eight zones 10$a$,10$b$,10$c$,10$d$,10$e$,10$f$,10$g$ and 10$h$ which, as shown in FIG. 2, are arranged in two parallel lines of four zones. The linear dimensions of that part of the surface of the measuring device over which the zones 10$a$ to 10$h$ of the device 9 extend are approximately 40×100 mm. The first line consists of two reflecting zones 10$a$,10$c$ and two absorbing zones 10$b$, 10$d$. The second line consists of two reflecting zones 10$f$,10$h$ and two absorbing zones 10$e$,10$g$. As may be seen from FIG. 2, the zones are thus arranged so that the reflecting zones and absorbing zones alternate both in the direction in which in use the device travels, and in the transverse direction, to form four rows of two zones in the direction of travel and two lines of four zones in the transverse direction.

Figure 3:
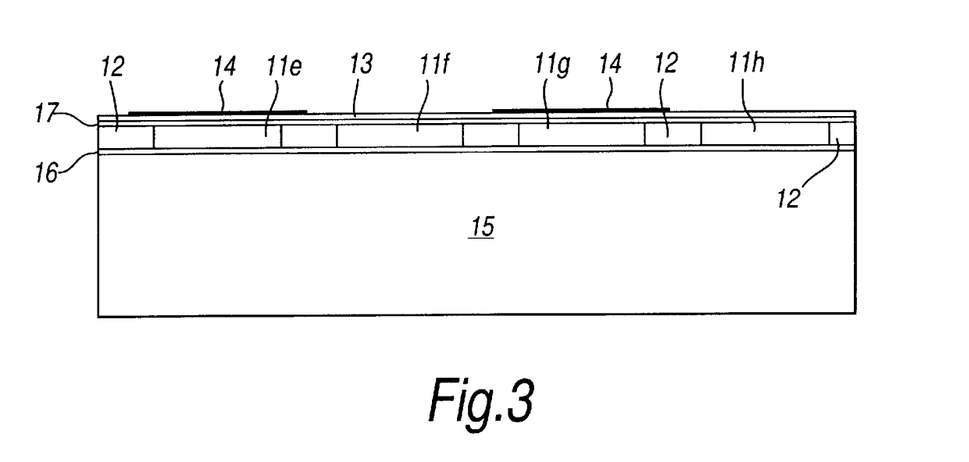
FIG. 3 is a schematic side view of the device of FIG. 2 not to scale.

Each zone 10$a$ to 10$h$ includes the exposed surface of a respective sensor. Each sensor comprises a thermopile 11$a$ to 11$h$ (see FIG. 4) designated to correspond to the respective absorbing and reflective zones 10$a$ to 10$h$ of FIG. 2. The thermopiles 11$a$ to 11$h$ are each inserted within apertures in a layer 12 of thermally insulating material (see FIG. 3 in which only the thermopiles 11$e$ to 11$h$ can be seen), which separates each thermopile from each adjacent thermopile. A portion of aluminium foil 13 covers the array. In the absorbing zones 10$b$,10$d$,10$e$ and 10$g$ the aluminium foil 13 has a blackened surface layer 14, which is a thin layer of matt black paint. In the reflecting zones 10$a$,10$c$,10$f$ and 10$g$ the surface of the aluminium foil 13 itself provides the reflective surfaces. The thermopiles 11$a$ to 11$h$ are each essentially identical in construction and include a thin sheet of thermally insulating material, for example a Kapton (trade mark) sheet, one set of junctions of the thermopile being on one side of the sheet and the other set of junctions being on the other side of the sheet. The thermopiles 11$a$ to 11$h$ are each mounted in thermal contact with a common heat sink in the form of a block 15, but electrically insulated therefrom by a thin insulating layer 16. The block 15 is made of a metal with a suitably high thermal conductivity and heat capacity, aluminium being preferred on the grounds of cost and weight. The upper surface of each thermopile is in thermal contact with the foil 13 but electrically insulated therefrom by a thin electrically insulating layer 17. The electrically insulating layers 16,17 may be of, for example, polyimide, and be of a thickness of 0.0005 inches (0.01 mm) (FIG. 3 is diagrammatic and not drawn to scale, but to indicate the different layers of the device clearly).

Figure 4:
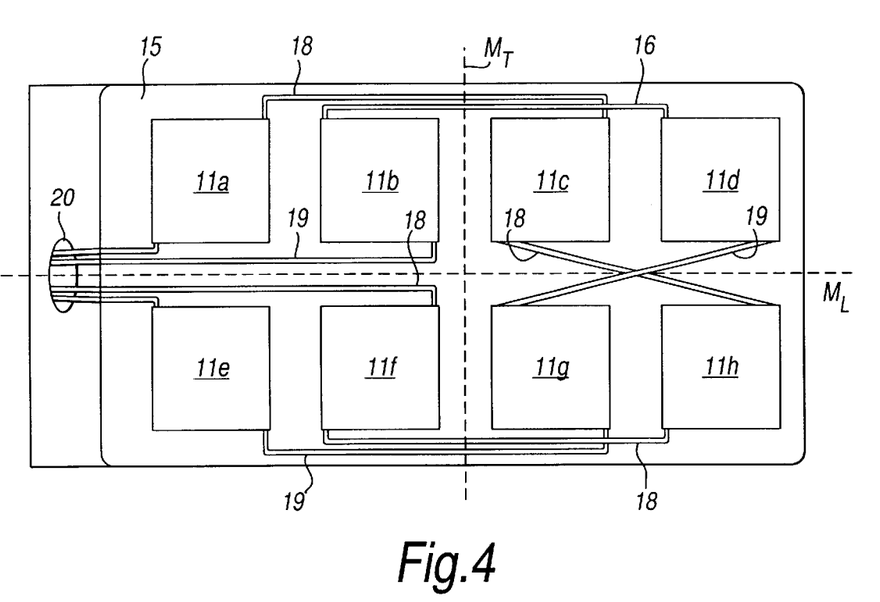
FIG. 4 is a plan view of the device of FIG. 2 with upper portions removed.

With reference to FIG. 4, the thermopiles 11$a$,11$c$, 11$f$, 11$h$ of the reflecting sensors are connected together in series by circuitry designated by reference numeral 18. The thermopiles 11$b$,11$d$,11$e$ and 11$g$ of the radiation-absorbing sensors are connected together in series, separately from thermopiles 11$a$,11$c$,11$f$,11$h$, by circuitry designated by reference numeral 19. The circuitry 18 and 19 are connected to conductors of a printed circuit board (PCB—not shown) via a bore 20 in the device.

In the array of radiation-absorbing and radiation-reflecting zones 10$a$ to 10$h$, each zone includes an exposed sensor surface which is coextensive with the upper surface of the corresponding thermopile underneath. It will be appreciated that, as shown in the drawings, each zone 10 will be larger than the upper surface of the corresponding thermopile in order to reduce any error arising from thermal conduction between radiation-reflecting zones and radiation-absorbing zones. The exposed sensor surfaces corresponding to each of thermopiles 11a to 11h are equal in size and, because the numbers of reflecting sensors and absorbing sensors are equal, the total area of the reflecting exposed sensor surfaces is equal to the total area of the radiation-absorbing exposed sensor surfaces. The separation between adjacent sensor surfaces is at least 5 mm. The radiation-reflecting exposed sensor surfaces, corresponding to thermopiles 11a,11c,11f,11h, are equally distributed about a mid-line $M_L$ of the array which coincides with the longitudinal axis of the array, that is, two reflecting sensor surfaces of the thermopiles 11f,11h, are below that mid-line and two reflecting sensor surfaces of the thermopiles 11a, 11c are above that mid-line as shown in FIG. 4. The radiation-reflecting exposed sensor surfaces are also equally distributed about a mid-line $M_T$ of the array which coincides with an axis which is perpendicular to $M_L$ and normally coincides with the direction of travel of the device. Thus, two reflecting sensor surfaces of the thermopiles 11a,11f, are located on one side of mid-line $M_T$ whilst two reflecting sensor surfaces of the thermopiles 11c,11h, are on the other side of mid-line $M_T$. Similarly, of the thermopiles having radiation-absorbing exposed sensor surfaces, two (11b,11d) are above the mid-line $M_L$ and two (11e,11g) below $M_L$, whilst two (11b,11e) are on one side of the mid-line $M_T$ and two (11d,11g) on the other side of $M_T$.

In the embodiment described, the thermopiles 11a to 11h are disposed about both $M_L$ and $M_T$ such that each exposed reflecting sensor surface is opposite an exposed radiation-absorbing exposed sensor surface. Such an arrangement is preferred, in order to achieve optimum results, but is not essential. In practice, it has been found that, in order to compensate adequately for spatial variations in heat flux within the area monitored by the device at any one time it is sufficient for the reflecting exposed sensor surfaces and the radiation-absorbing exposed sensor surfaces each to be substantially equally distributed between the front and rear portions and between the two lateral portions of the array. Thus, it is sufficient for the areas of reflecting exposed sensor surfaces in the front and rear halves of the array to be approximately equal, and for the areas of reflecting exposed sensors in the two lateral halves of the array to be approximately equal, whilst the radiation-absorbing exposed sensor surface are similarly distributed between the front and rear halves and between the lateral halves of the array.

Mounted on the upper surface of the sensor device 9 are at least two thermocouple measurement junctions (not shown) associated with at least one of the exposed absorbing zones 10b,10d,10e,10g and, respectively, at least one of the reflecting zones 10a,10c,10f,10h. In general, it will be an acceptable approximation in practice to assume that the temperatures of all the absorbing zones 10b,10d,10e,10g are equal and the temperatures of all the reflecting zones 10a, 10c,10f,10h are equal, and it will therefore normally be sufficient to provide a thermocouple junction at one of the absorbing surface zones and a thermocouple junction at one of the reflecting surface zones. A pair of leads runs from the thermocouple junction to bore 20 and thence to the underside of the block 15 and to the PCB.

Whereas the thermopiles 11a to 11h give an e.m.f. indicative of the temperature differences across, and hence of the heat flux through, the insulating layers of the sensors, the thermocouple measurement junction enables a measurement to be made of the temperature of the upper surface of the sensor device 9.

Figure 5:
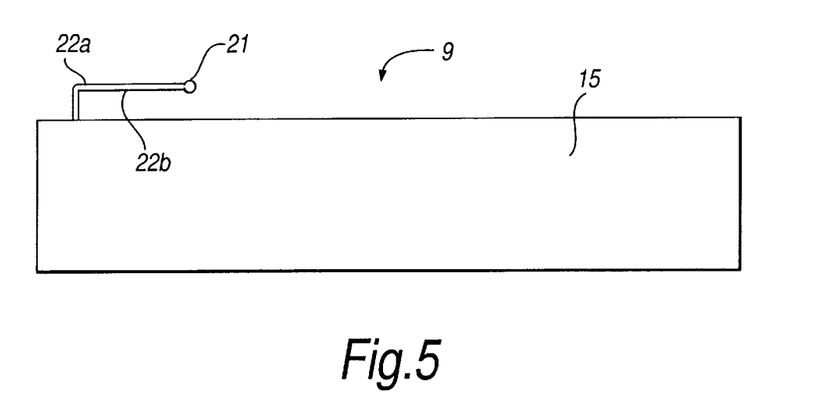
FIG. 5 is a side view of the device.

With reference to FIG. 5, the sensor device 9 also has associated with it a further thermocouple junction 21, for example a flexible air thermocouple, from which a flexible pair of leads 22a,22b runs through bore 20 in the block 15 to the underside of the block 15. The thermocouple measurement junction 21 permits measurement of the gas temperature a short distance above the upper surface of the sensor device 9. Because of the flexibility of the pair of leads 22a,22b, the precise positions of the thermocouple junction 21 can readily be adjusted.

The apparatus is battery-operated, the batteries (which are not shown) being housed within the interior of the casing 1.

The signals that are carried by conductors on the PCB pass to an analogue-to-digital converter. The corresponding digital signals emanating from the analogue-to-digital converter are passed to a recording means in the form of a microcontroller, which includes a microprocessor.

The microcontroller serves to store the data acquired by the apparatus during a passage of the apparatus through the oven. After the apparatus has passed through the oven, the data that has been acquired during the passage and stored in the microcontroller is downloaded to a computer.

The data is recorded periodically at intervals of 0.25 sec, that is to say, at a frequency of 4 $sec^{-1}$. If that frequency is not higher than the frequency of pulses of heat input, for example, from nozzles or burners, it may be found that the results obtained are not repeatable.

In order to prevent or reduce the risk of errors resulting from a disturbance of the gas flow pattern by the apparatus as it passes through the oven, the apparatus is provided with a detachable extension, the position of which is shown by broken lines in FIG. 1 and indicated generally by the reference numeral 23. The extension 23 consists of a rectangular plate and at its rear end a downwardly extending flange formed with apertures to receive bolts for releasably securing the extension to the front of the casing 1.

When the extension 23 is secured to the casing 1, the upper surface of the rectangular plate, which extends over the entire width of the casing 1 (and thus well beyond the lateral edges of the sensor device 9), is flush with the upper surface of the casing. The main disturbance of the gas flow caused by the passage of the apparatus through the oven is in the vicinity of the leading end of the apparatus which, when the extension 23 is not fitted, is in the vicinity of the sensor device 9. When the extension 23 is fitted, the leading end of the apparatus is the leading edge of the extension 23, so that the region of significant disturbance of the gas flow is displaced forwards, away from the sensor device 9, by a distance equal to the length of the extension 23.

In use, the apparatus is placed on the conveyor that is used to convey material to be heated through the oven, with the sides of the casing 1 extending in the direction of movement and the leading end 4 in front. The extension 23 is normally fitted. Also, before the apparatus is allowed to enter the oven, the upper surface of the sensor device 9 must be brought up to a temperature exceeding the dewpoint of the gas in the oven. That can be achieved by exposing that surface, but not the remainder of the apparatus, to a temperature-controlled air-flow. If the upper surface of the sensor device 9 is not brought up to the required temperature, there will be condensation on the upper surfaces of the sensor device, and the upper surface of the reflecting zones will become significantly less reflecting, so that the readings will be seriously distorted.

When the apparatus has passed through the oven, the data logged by the microcontroller is downloaded to a computer, and the heat flux profile along the length of the oven, for both the convective component and the radiative component of the heat flux, is obtained.

If, as is sometimes the case, it is desired to investigate the heat flux profile close to a side of the oven, the extension 18 is removed and the apparatus is so placed on the conveyor that the sides of the casing 1 extend across the width of the oven and the end 4 of the casing is close to the side of the oven.

Figure 6:
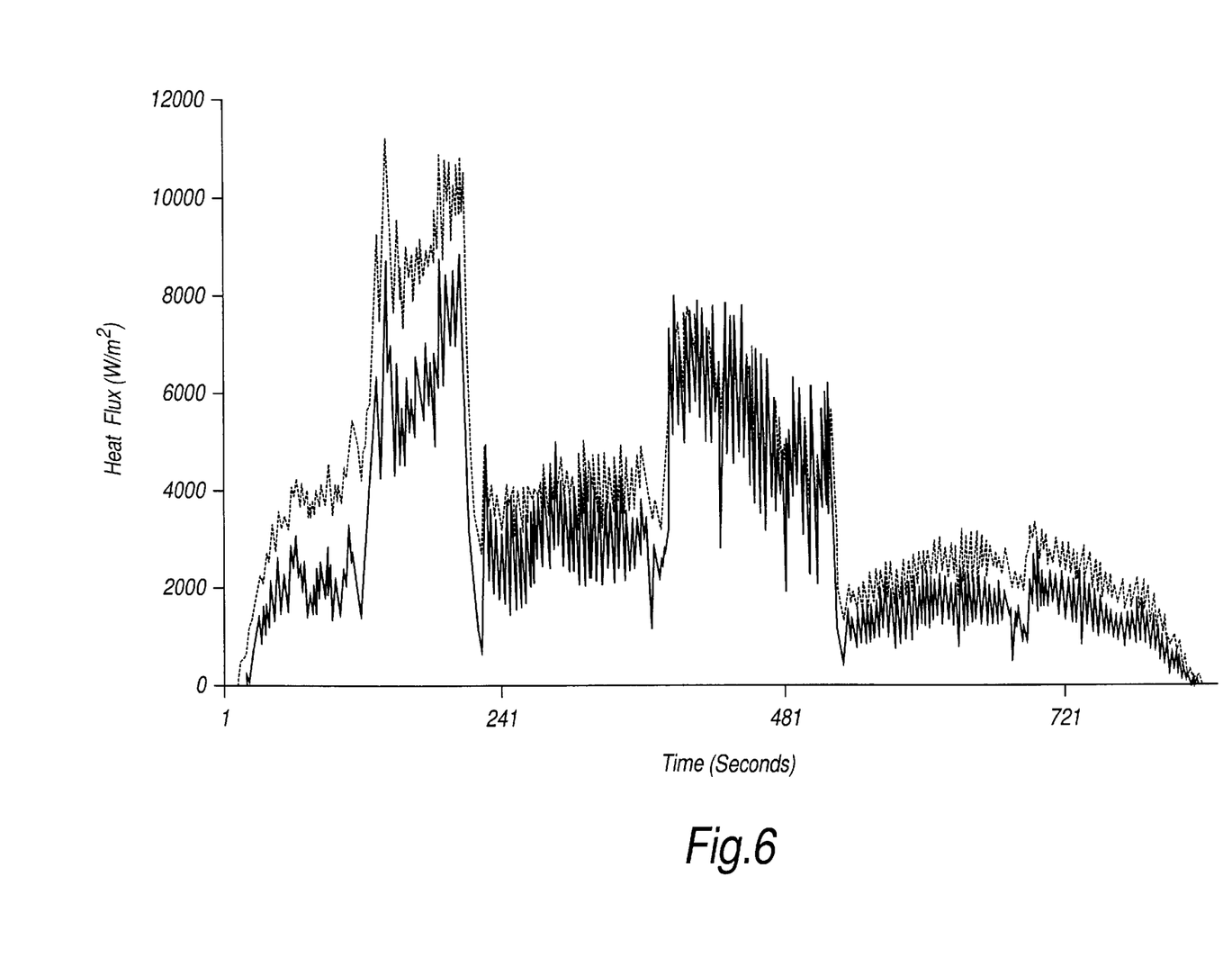
FIG. 6 is a graph showing recorded signals from the device as it travels through a tunnel oven.

FIG. 6 is a graph showing measured values for heat flux measured from the radiation-absorbing surfaces and heat flux measured from the reflecting surfaces of sensor device 9 passed through a tunnel oven. It will be appreciated that the radiant heat flux is correlated with the difference between those two values.

As already mentioned, in practice the radiation-absorbing surface will not be perfectly absorbing to radiant heat and/or the radiation-reflecting surface will not be perfectly reflecting. In those circumstances, the values of the irradiation energy incident on both surfaces (G) and the convection coefficient (h—assumed to be equal on both surfaces) can be obtained by solving the simultaneous equations (1) and (2) below, where (1) represents the heat flux measured through the radiation-absorbing (black) sensor and (2) represents the heat flux measured through the radiation-reflecting (silver) sensor.

$$Q_b = \epsilon_b(G - \sigma T_b^4) + h(T_{air} - T_b) \quad (1)$$

$$Q_s = \epsilon_s(G - \sigma T_s^4) + h(T_{air} - T_s) \quad (2)$$

Where:
$Q_b$—heat flux measured through black sensor (W/m$^2$)
$Q_s$—heat flux measured through silver sensor (W/m$^2$)
$\sigma$—Stefan Boltzmann constant (W/m$^2$K$^4$)
$\epsilon_b$—emissivity of black surface
$\epsilon_s$—emissivity of silver surface
G—irradiation energy incident on both surfaces (W/m$^2$)
$T_{air}$—surrounding air temperature (K)
$T_b$—temperature of black surface (K)
$T_s$—temperature of silver surface (K)
h—convection coefficient (assumed to be equal on both surfaces) (W/m$^2$K)

What is claimed is:

1. A heat flux measuring device for transporting through a heated chamber, the device having an array of sensors, each sensor comprising first and second surfaces bounding a region, a thermally insulating layer substantially occupying said region, and means for providing a signal which is a measure of the temperature difference across the layer, said first surface of each sensor being in thermal contact with a heat sink and said second surface of each sensor being exposed, a plurality of said exposed surfaces of the array being reflective to radiation and a further plurality of said exposed surfaces of the array being absorbent to radiation, the sensors of the array being so arranged that the area of radiation-absorbing exposed sensor surface and the area of radiation-reflecting exposed sensor surface are each substantially equally distributed about a mid-line of the array extending along the direction in which in use the device will be transported and about a mid-line of the array extending along the direction transverse to the direction in which in use the device will be transported.

2. A device according to claim 1, in which each reflecting exposed surface is a surface of the insulating layer of the respective sensor.

3. A device according to claim 1, in which each reflecting exposed surface comprises a layer of reflecting material that is in contact with the insulating layer of the respective sensor.

4. A device according to claim 1, in which each absorbing exposed sensor surface is a surface of the insulating layer of the respective sensor.

5. A device according to claim 1, in which each absorbing exposed sensor surface comprises a layer of radiation-absorbing material that is in contact with the insulating layer of the respective sensor.

6. A device according to claim 1, in which the array is so arranged that the reflecting and absorbing surfaces form portions of a substantially continuous surface.

7. A device according to claim 1, in which the reflecting and absorbing surfaces are spaced from one another.

8. A device according to claim 1, which is arranged to generate a cumulative signal representative of the sum of the individual sensor signals of those sensors having a reflecting surface.

9. A device according to claim 8, in which those sensors having a reflecting surface are connected in series.

10. A device according to claim 1, which is arranged to generate a cumulative signal representative of the sum of the individual sensor signals of those sensors having an absorbing surface.

11. A device according to claim 10, in which those sensors having an absorbing surface are connected in series.

12. A device according to claim 1, further comprising means for comparison of a cumulative signal representative of the signals of those individual sensors having a reflecting surface with a cumulative signal representative of the signals of those individual sensors having an absorbing surface.

13. A device according to claim 12, wherein the comparison means is arranged to compare the cumulative signal for the reflecting sensors with the cumulative signal for the absorbing sensors, and provide an indication of radiant heat received by the sensors.

14. A device according to claim 1, in which each said exposed sensor surface of the array is of substantially equal area.

15. A device according to claim 1, in which exposed surfaces of the array have an overall configuration which is substantially rectangular.

16. A device according to claim 1, in which exposed surfaces of the array have an overall configuration which is substantially square.

17. A device according to claim 1, in which the individual reflecting exposed sensor surfaces and the individual absorbing exposed sensor surfaces are each substantially rectangular.

18. A device according to claim 1, in which the individual reflecting exposed sensor surfaces and the individual absorbing exposed sensor surfaces are each substantially square.

19. A device according to claim 1, in which the array comprises three or more reflecting sensor surfaces and three or more absorbing sensor surfaces.

20. A device according to claim 1, in which the array comprises at least two parallel rows of alternate reflecting sensor surfaces and absorbing sensor surfaces extending in the direction in which in use the device travels.

21. A device according to claim 1, which comprises at least two parallel lines of alternate reflecting sensor surfaces and absorbing sensor surfaces extending in the transverse direction.

22. A device according to claim 1, in which each said sensor comprises a thermopile.

23. A device according to claim 1, which comprises means for ascertaining the temperature of the exposed radiation-absorbing sensor surfaces and/or means for ascertaining the temperature of the exposed radiation-reflecting sensor surfaces.

24. A device according to claim 1, which comprises means for ascertaining the gas temperature in the vicinity of the exposed surfaces of the sensors.

25. A device according to claim 1, in which the heat sink is a unitary body of heat conductive material.

26. A device according to claim 1 further comprising data processing/storage means arranged to travel with the device, in use, or arranged to be located outside the heated chamber.

27. A device according to claim 26, wherein the data processing means is arranged to sum or average the individual signals from the sensors having reflecting surfaces and the individual signals from the sensors having absorbing surfaces, respectively.

28. A method of measuring heat flux in a heated chamber, comprising conveying through at least a portion of the chamber a heat flux measuring device having an array of sensors, a plurality of the sensors each having an exposed surface which is reflecting to radiation and a further plurality of the sensors each having an exposed surface which is absorbing to radiation and the sensors of the array being so arranged that the area of radiation-absorbing exposed sensor surface and the area of radiation-reflecting exposed sensor surface are each substantially equally distributed about a mid-line of the array extending along the direction in which the device is transported and about a mid-line of the array extending along the direction transverse to the direction in which the device is transported, monitoring the outputs of the respective sensors and deriving from said outputs a value which is representative of the heat flux.

29. A method according to claim 28, in which the output of those sensors of which the exposed surface is reflecting to radiation is summed.

30. A method according to claim 28, in which the output of those sensors of which the exposed surface is absorbing to radiation is summed.

31. A method according to claim 30, in which the output of those sensors having a reflecting surface is summed to generate a first summation product, the output of those sensors having a radiation-absorbing surface is summed to generate a second summation product, the temperature of at least one reflecting surface, the temperature of at least one radiation-absorbing surface and the air temperature in the vicinity of the device are each measured, and a value for the radiative component is calculated.

* * * * *